United States Patent [19]

Huang

[11] Patent Number: 5,718,444

[45] Date of Patent: Feb. 17, 1998

[54] FOLDING COLLAPSIBLE STROLLER

[75] Inventor: Wan Fa Huang, Tainan, Taiwan

[73] Assignee: Keelierl Industrial Co., Ltd., Tainan, Taiwan

[21] Appl. No.: 589,977

[22] Filed: Jan. 23, 1996

[51] Int. Cl.[6] ................................................ B62B 7/06
[52] U.S. Cl. ........................................ 280/650; 280/47.4
[58] Field of Search ........................... 280/642, 647, 280/650, 655, 658, 47.38, 47.4

[56] References Cited

U.S. PATENT DOCUMENTS

| | | | |
|---|---|---|---|
| 5,110,150 | 5/1992 | Chen | 280/47.38 |
| 5,158,319 | 10/1992 | Norcia et al. | 280/650 |
| 5,388,853 | 2/1995 | Lauro | 280/642 |

FOREIGN PATENT DOCUMENTS

| | | | |
|---|---|---|---|
| 2603240 | 3/1988 | France | 280/642 |
| 2677600 | 12/1992 | France | 280/650 |
| 4022391 | 10/1991 | Germany | 280/647 |

*Primary Examiner*—Brian L. Johnson
*Assistant Examiner*—Frank Vanaman
*Attorney, Agent, or Firm*—Pro-Techtor International

[57] ABSTRACT

A folding collapsible stroller that includes a pair of constraint devices to hold the stroller in an operative position. The constraint devices have a sector groove and a deep blind hole at a top side thereof. A projecting portion is situated between the sector groove and the blind hole. A projecting rod is inserted into the sector groove to secure the constraint device in the closed position. The projecting rod is moved into the blind hole to allow the constraint device to engage the top end of the side frame to hold the stroller in the operative position.

4 Claims, 7 Drawing Sheets

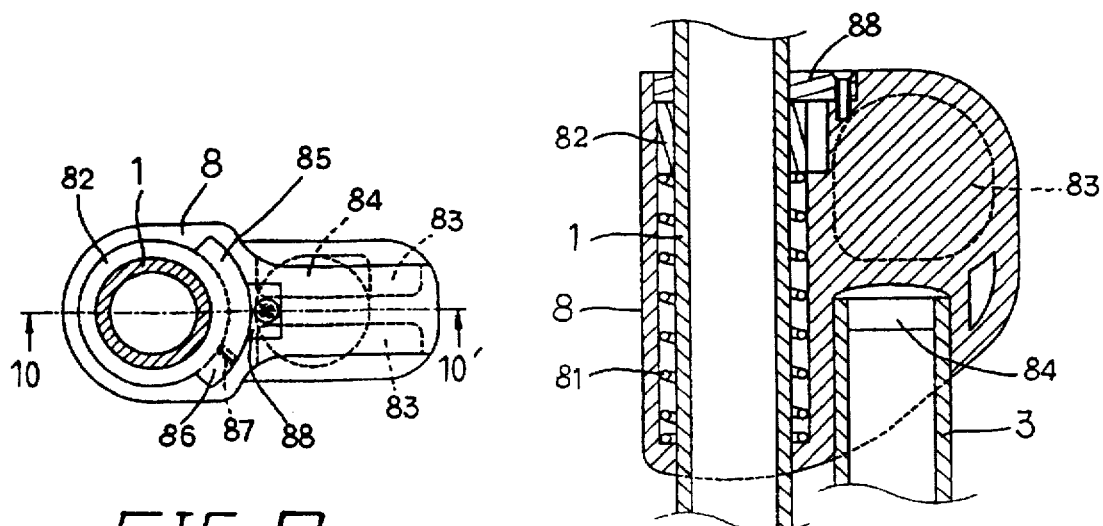
FIG. 9
FIG. 10
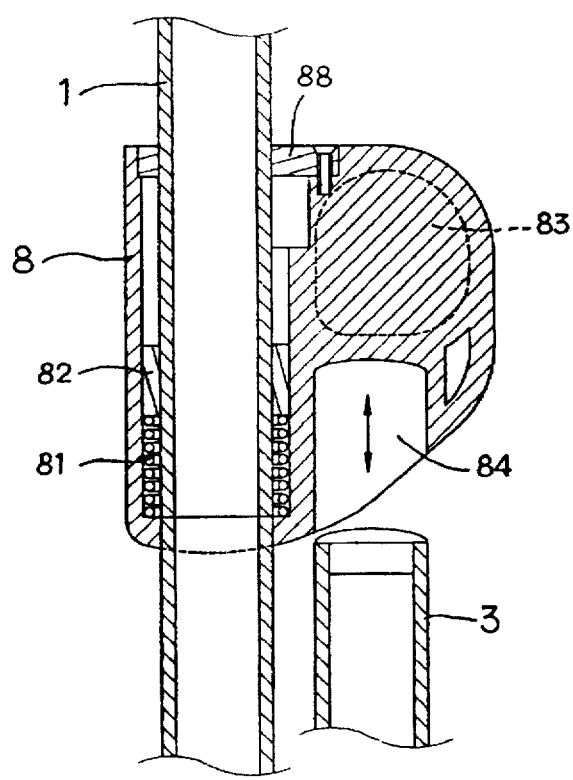
FIG. 11

FOLDING COLLAPSIBLE STROLLER

BACKGROUND OF THE INVENTION

The present invention relates to folding collapsible strollers, and relates more particularly to a three-fold type folding collapsible strollers which can be conveniently arranged between the collapsed position and the extended position and, which needs less storage space when collapsed.

Regular strollers are commonly made collapsible so that the storage space can be minimized when collapsed. FIGS. 1, 2, and 3 show a folding collapsible stroller according to the prior art, which comprises a handle 10, two front wheel frames 20, two rear wheel frames 30, a sear frame 40, and a canopy frame 50. The canopy frame 50 is pivoted to the handle 10 at a suitable location, and can be turned upwards to be closely attached to the handle 10. A hook 101 is mounted on the handle 10 and controlled to hold the lugs 201 at the top ends of the rear wheel frames 20. Two constraint plates 202 are respectively fastened to the front wheel frames 20 adjacent to the lugs 201 to hold the hook 101 in the engaged position. The rear wheel frames 20 are pivotably connected to the the handle 50 at the bottom. The rear wheel frames 30 are pivotably connected to the handle 50 at two opposite sides far from the rear wheel frames 20 and the hook 101. When the stroller is collapsed as shown in FIG. 3, the front wheel frames 20 and the rear wheel frames 30 are disposed at different elevations, and the top ends of the front wheel frames 20 project over the top ends of the rear wheel frames 30 at a distance, therefore much storage space is still needed, and the transportation cost of the folding collapsible stroller still cannot be greatly reduced.

SUMMARY OF THE INVENTION

The present invention has been accomplished to provide a folding collapsible stroller which eliminates the aforesaid drawbacks. It is one object of the present invention to provide a folding collapsible stroller which can be conveniently arranged between the collapsed position and the extended position. It is another object of the present invention to provide folding collapsible stroller which needs less storage space when collapsed. According to the preferred embodiment of the present invention, the folding collapsible stroller comprises a handle, a canopy frame, a pair of front wheel frames to hold a pair of footrests and a pair of front wheels, a pair of rear wheel frames to hold a pair of rear wheels, a seat frame, two side frames, and two constraint devices for holding the stroller in the operative position, wherein two first brackets are pivotably connected between the handle, the front wheel frames, and the rear wheel frames; the side frames are respectively inserted through the first brackets, each having a bottom end connected in parallel to one front wheel frame and a top end coupled to one constraint device; two second brackets are pivotably connected between the seat frame and the rear wheel frames; two seat frame holders are pivotably connected between the second brackets and the canopy frame; each constraint device having a sector groove and a deep blind hole at the top, a projecting portion disposed between the sector groove and the deep blind hole, a projecting rod raised inserted into the sector groove to hold the respective constraint device in a collapsed position, the projecting rod being forced to move over the projecting portion into the deep blind hole when the respective constraint device is turned outwards relative to the handle, permitting the respective constraint device to be moved into engagement with the top end of the respective side frame to hold the stroller in the operative position. Because the front wheel frames and the rear wheel frames are respectively pivoted to the first brackets at the two opposite ends of the handle, they are closely attached together in a substantially parallel relation to minimize space occupation when the stroller is collapsed.

BRIEF DESCRIPTION OF THE DRAWINGS

FIG. 9 is a plain view showing the constraint device mounted on the handle according to the present invention;

FIG. 10 is a sectional view taken along line B–B' of FIG. 9;

FIG. 11 is similar to FIG. 10 but showing the constraint device moved upwards and disengaged from the respective side frame;

DETAILED DESCRIPTION OF THE PREFERRED EMBODIMENT

Figure 1:
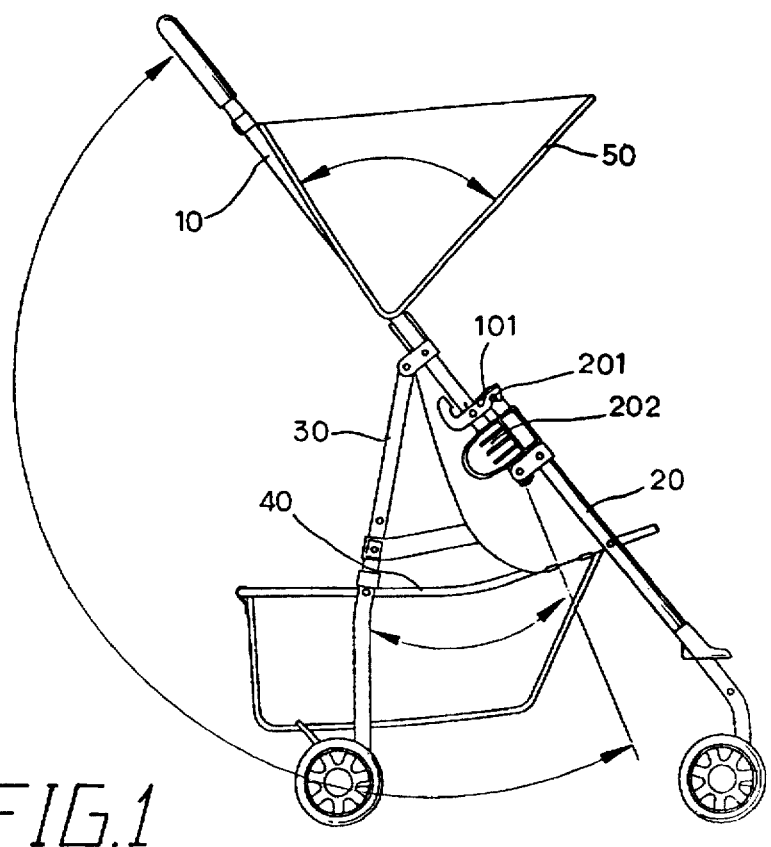
FIG. 1 is a side view of a folding collapsible stroller according to the prior art when extended out.
Figure 2:
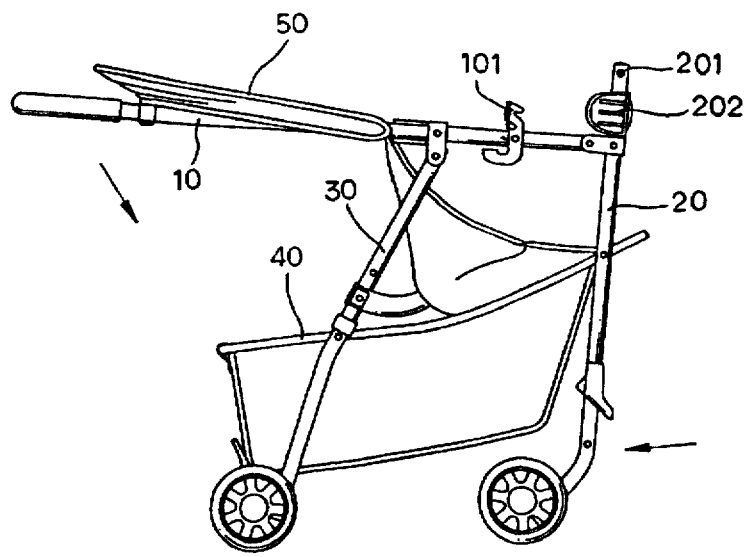
FIG. 2 shows the collapsing direction of the folding collapsible stroller shown in FIG. 1.
Figure 3:
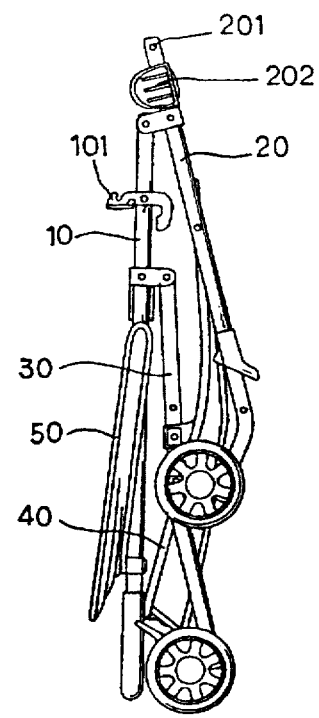
FIG. 3 shows the folding collapsible stroller of FIG. 1 collapsed.
Figure 4:
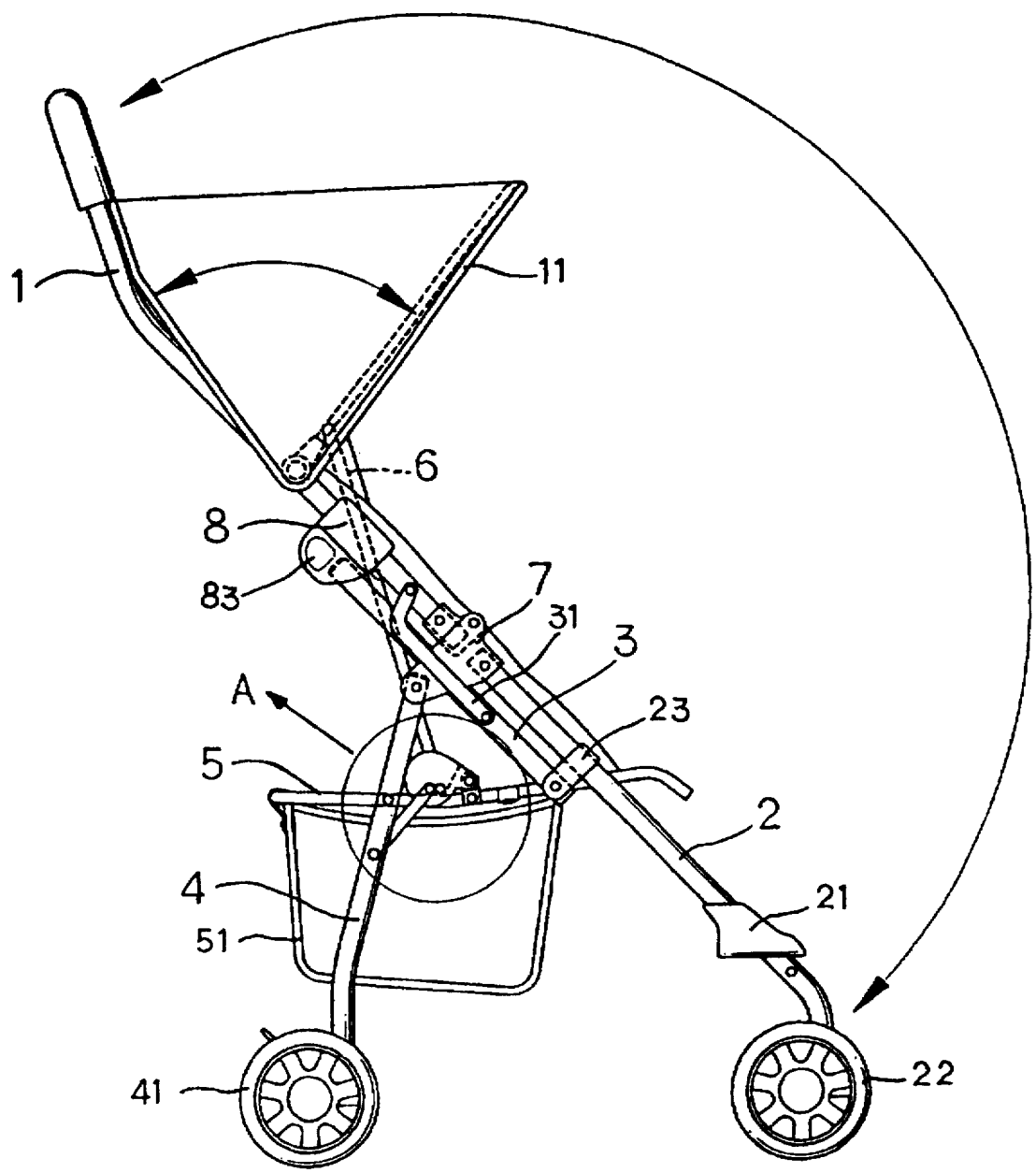
FIG. 4 is a side view of a folding collapsible stroller according to the present invention when extended out.
Figure 5:
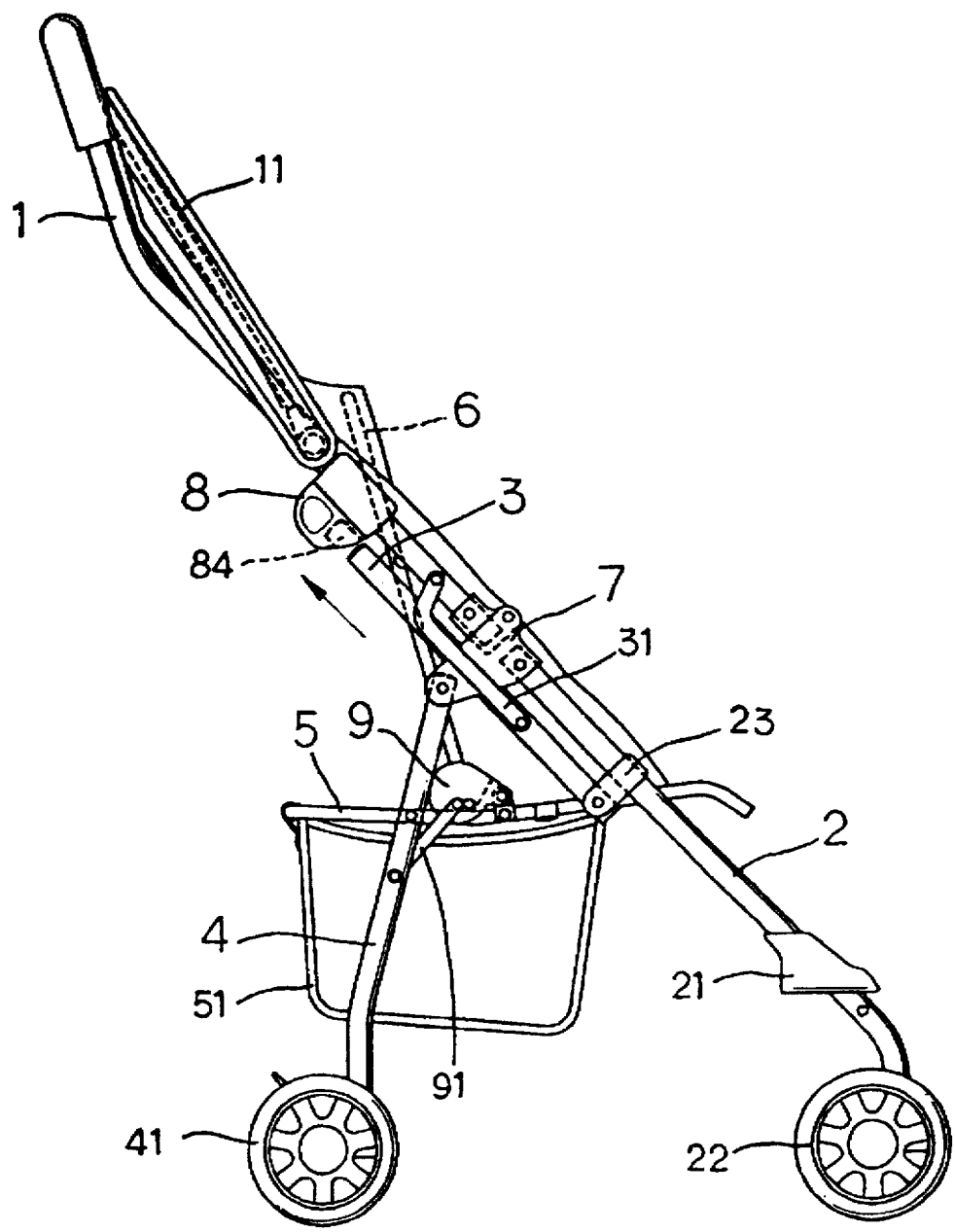
FIG. 5 is similar to FIG. 4 but showing the canopy frame collapsed.
Figure 6:
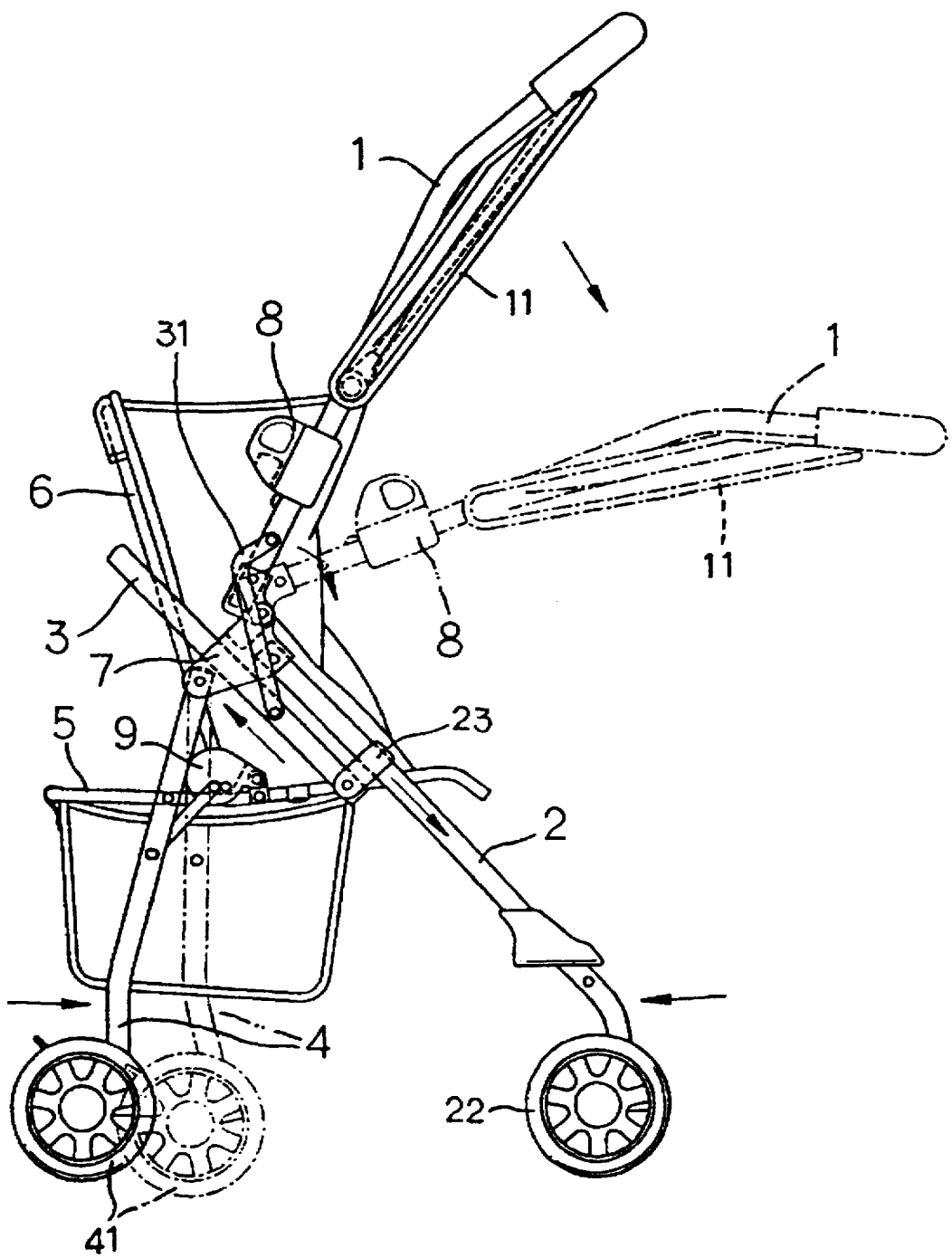
FIG. 6 is another side view of the present invention, showing the handle turned forwardly downwards toward the front wheel frames, and the rear wheel frames moved toward the front wheel frames.
Figure 8:
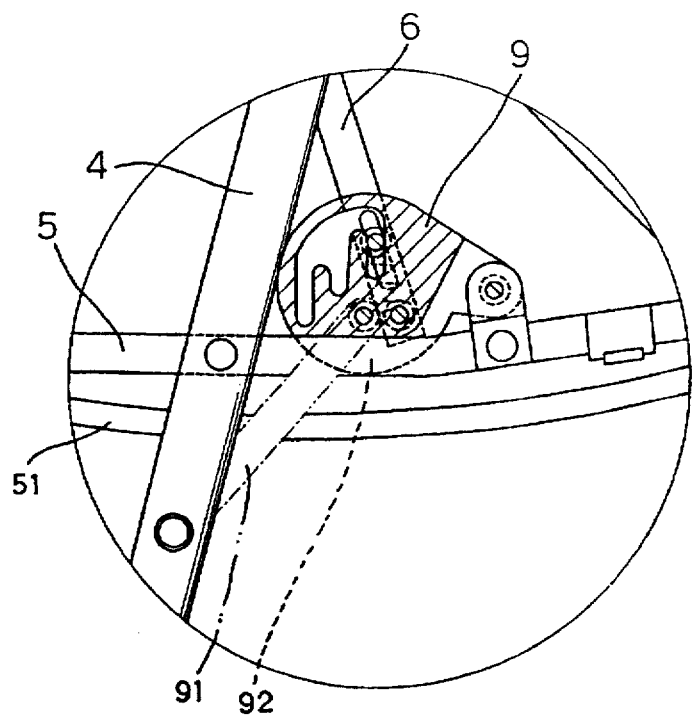
FIG. 8 is an enlarged view of part A of FIG. 4.
Figure 12:
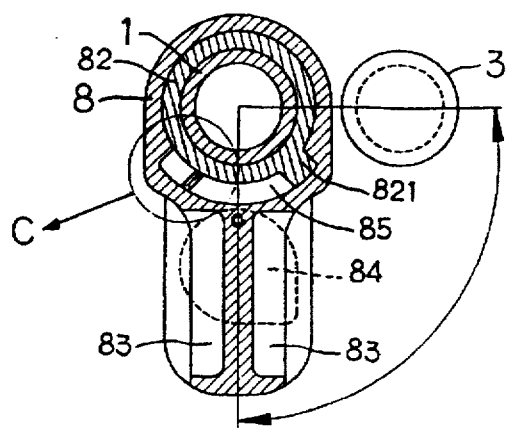
FIG. 12 is a sectional view of the constraint device according to the present invention, showing the projecting rod of the spring holder inserted into the sector groove.
Figure 13:
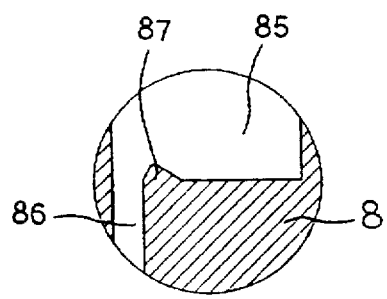
FIG. 13 is a sectional view in an enlarged scale of part C of FIG. 12.
Figure 14:
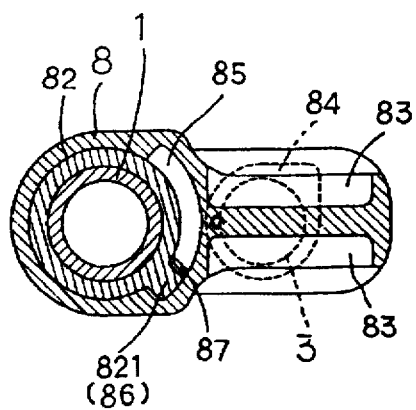
FIG. 14 is another sectional view of the constraint device according to the present invention, showing the projecting rod of the spring holder moved into the deep blind hole.

Referring to FIGS. 4 and 5, a folding collapsible stroller in accordance with the present invention is generally comprised of a handle 1, a pair of front wheel frames 2, a pair of side frames 3, a pair of rear wheel frames 4, a seat frame 5, and a seat frame holder 6. A canopy frame 11 is pivotably connected to the handle 1 at a suitable elevation, and turned relative to the handle 1. Two first brackets 7 are pivotably connected to the handle 1 at two opposite sides near the bottom end to hold the top ends of the front wheel frames 2 and the rear wheel frames 4. Two constraint devices 8 are movably connected to the handle 1 at two opposite sides at a suitable elevation, and controlled to hold the side frames 3 in place. Each of the front wheel frames 2 has a bottom end coupled with a footrest 21 and a front wheel 22, a stop end pivoted to one first bracket 7 of the handle 1, and a middle part connected to the bottom end of one side frame 3 by a connecting plate 23. The side frames 3 are disposed in parallel to the front wheel frames 2 and inserted through the first brackets 7, each having a top end constrained by one constraint device 8 and a bottom end connected to one connecting plate 23. Two guard plates 31 are respectively connected between the side frames 3 and the handle 1 to protect the first brackets 7. Each of the rear wheel frames 4 has a top end pivoted to one first bracket 7, a bottom end coupled with a rear wheel 41, and a middle part pivotably connected to one side of the seat frame 5. The seat frame 5 has a U-shaped profile. The two front ends of the seat frame 5 are respectively pivoted to the connecting frames 23. Two second brackets 9 are pivotably connected to two opposite lateral sides of the seat frame 5, and respectively connected to the rear wheel frames 4 by a respective link 51. Each of the second brackets 9 has a bottom recess 92 (see FIG. 8), which receives the seat frame 5 when collapsed. A container 51 is suspended from the seat frame 5 for holding things. The container 51 is preferably made from cloth. The seat frame holders 6 are respectively pivotably connected between the canopy frame 11 and the second brackets 9.

Figure 7:
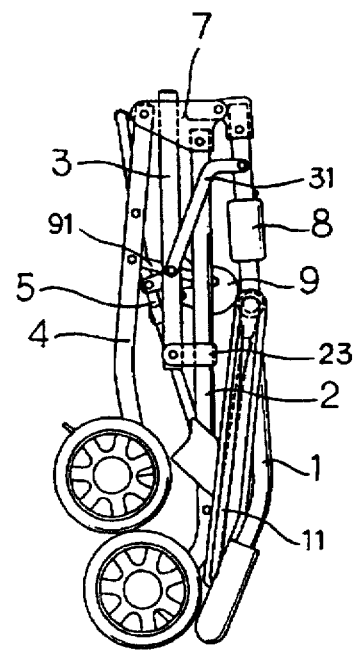
FIG. 7 is still another side view of the present invention, showing the folding collapsible stroller collapsed.

Referring to FIGS. 9 to 14, the constraint device 8 is movably mounted on the handle 1, comprising a spring 81 and a spring holder 82 on the inside (see FIGS. 10 and 11). The spring holder 82 is fixedly mounted on the handle 1 to limit the sliding distance of the constraint device 8 on the handle 1. Two recessed holes 83 are made on two opposite sides of the constraint device 8 near the top convenient for the holding of the hand. A coupling chamber 84 is made at the bottom side of the constraint device 8, which receives the top end of one side frame 3 when the constraint device 8 is moved downwards. A sector groove 85 and a deep blind hole 86 are made at the top side of the constraint device 8 (see FIGS. 9 and 12). The deep blind hole 86 is disposed at one end of the sector groove 85. A projecting portion 87 is disposed between the sector groove 85 and the deep blind hole 86. The projecting portion 87 has a sloping side facing the sector groove 85 and an upright side facing the deep blind hole 86 (see FIG. 13). The spring holder 82 has a projecting rod 821 inserted into the sector groove 85 to hold the constraint device 8 in the collapsed position (see FIGS. 7 and 12). When the constraint device 8 is turned outwards relative to the handle 1, the projecting rod 821 of the spring holder 82 is forced to pass over the projecting portion 87 into the deep blind hole 86. When the projecting rod 821 is moved into the deep blind hole 86, it is stopped at the upright side of the projecting portion 87 to confine the constraint device 8 to an axial movement (see FIG. 14). Furthermore, a top cap 88 is fixed to the top side of the constraint device 8 (see FIGS. 9, 10, and 11).

The procedure of collapsing the folding collapsible stroller is easy and outlined hereinafter with reference to FIGS. 5, 6, 7, and 11. When the constraint devices 8 are pulled upwards to disconnect the respective coupling chambers 84 from the side frames 3, the handle 1 is turned forwardly downwards toward the front wheel frames 2, causing the rear wheel frames 4 moved toward the front wheel frames 2, and therefore the handle 1, the front wheel frames 2, and the rear wheel frames 4 are closely attached together (see FIG. 7). When to extend out the collapsed folding collapsible stroller, the handle 1 is pulled outwards and upwards from the front wheel frames 2, the rear wheel frames 4 are simultaneously forced outwards from the front wheel frames 2. When the handle 1, the front wheel frames 2 and the rear wheel frames 4 are fully extended out, the constraint devices 8 are respectively forced into position to hold the top ends of the side frames 3 in the respective coupling chambers 84.

It is to be understood that the drawings are designed for purposes of illustration only, and are not intended as a definition of the limits and scope of the invention disclosed.

What the invention claimed is:

1. A folding collapsible stroller comprising a handle, a canopy frame pivoted to said handle, a pair of front wheel frames pivoted to said handle, each said front wheel frame includes a footrest and a front wheel, a pair of rear wheel frames pivoted to said handle, each said rear wheel frame includes a rear wheel, a seat frame pivotably connected between said front wheel frames and said rear wheel frames, and two constraint devices having a respective spring holder fixedly secured to said handle and a respective spring connected to the respective spring holder, said constraint devices being moved relative to said handle between an operative position to hold the stroller in the operative position, and a non-operative position for permitting the stroller to be collapsed, wherein:

two first brackets are respectively pivoted to said handle at two opposite sides;

said front wheel frames and said rear wheel frames have a respective top end pivoted to one first bracket;

two side frames are each inserted through a respective one of said first brackets and disposed in parallel to said front wheel frames, each said side frame having a bottom end connected to one front wheel frame by a respective connecting plate, and a top end coupled to one constraint device;

two second brackets respectively pivoted to said seat frame at two opposite sides and respectively connected to said rear wheel frames by a respective second link, each said second bracket having a bottom recess, which is closely attached to said seat frame when the stroller is collapsed;

two seat frame holders are pivotably connected between said second brackets and said canopy frame;

said constraint devices are mounted on said handle and moved to hold the top ends of said side frames in a respective bottom coupling chamber of said constraint devices, each said constraint device comprising a sector groove and a deep blind hole at a top side, a projecting portion disposed between said sector groove and said deep blind hole, said projecting portion having a sloping side facing said sector groove and an upright side facing said deep blind hole, a projecting rod extended from the respective spring holder and inserted into said sector groove to hold the respective constraint device in a collapsed position, the projecting rod of said spring holder being forced to move over said projecting portion into said deep blind hole when the respective constraint device is turned outward relative to said handle, permitting the respective constraint device to be moved into engagement with the top end of the respective side frame.

2. The folding collapsible stroller of claim 1 wherein two guard plates are respectively connected between said side frames and said handle at two opposite sides to protect said first brackets.

3. The folding collapsible stroller of claim 1 wherein said constraint devices have a respective top side covered with a respective cap.

4. The folding collapsible stroller of claim 1 wherein each constraint device has two recessed portions bilaterally disposed near a rear end to serve as handgrips.

* * * * *